Patented Apr. 27, 1937

2,078,826

UNITED STATES PATENT OFFICE 2,078,826

WOOD PRESERVATIVE

Karl Wolman, Berlin-Grunewald, and Hans Pflug, Berlin-Wilmersdorf, Germany, assignors, by mesne assignments, to American Lumber & Treating Company, Chicago, Ill.

No Drawing. Application October 26, 1931, Serial No. 571,284. In Germany November 13, 1930

2 Claims. (Cl. 134—78.6)

The present invention relates to improved preservatives of wood consisting of the sodium salts of hydrofluoric acid and of water-soluble chromium compounds which, besides having an excellent action against wood destructive fungi, show a great resistance to the leaching out by water. Furthermore, the present invention relates to a process of preserving wood.

We have found that a wood preservative which is difficultly leached out by water, can be prepared from the sodium salts of hydrofluoric acid, such as sodium fluoride (NaF) or sodium bifluoride ($NaHF_2$), and the water-soluble salts of chromium, such as chromic sulfate, chrome alum, the water-soluble salts of chromic acid, such as the chromates, or dichromates, e. g. sodium chromate, potassium chromate, sodium dichromate or potassium dichromate or mixtures of them, if the salts of hydrofluoric acid and the chromium compounds are used in such proportions as will enable the water-soluble sodium fluorides, after the aqueous solution has dried in the wood, to transform by a chemical reaction with the chromium compounds into a compound of the type of $CrF_3.2NaF$, which is difficultly soluble in water. According to the present invention, water-soluble sodium salts of hydrofluoric acid are used as the fluorine compound, the proportion between the fluorine compounds and the chromium salts being such that the formation of chromium cryolite ($CrF_3.3NaF$) or similar difficultly soluble compounds is facilitated. This is obtained for instance by using so much chromium compound in proportion to the fluorine (F) contained in the sodium salt of the hydrofluoric acid, that to each atom of fluorine (F) $\frac{1}{5}$ atom each of chromium (Cr) is contained in the preservative. The chromates and dichromates are first reduced in the wood to chromic compounds which thereafter react with the fluorine compounds. It was found that it is not necessary to transform the total quantity of sodium fluorides into the difficultly soluble fluorine-chromium compound, excellent results being already obtained if about half of the sodium salt is transformed into the difficulty soluble fluorine-chromium compound. Therefore it is sufficient if $\frac{1}{10}$ atom of chromium (Cr) each to 1 atom of fluorine (F) is contained in the preservative. In a preferred form of the invention we use $\frac{1}{10}-\frac{1}{5}$ atom of chromium to each atom of fluorine.

Example 1.—3.4 parts of chrome alum and 1.7 parts of sodium fluoride are mixed together. This preservative is used for the treatment of wood in such a way that about 2½ parts of the mixture are dissolved in 100 parts of water. About 10% of tartaric acid, calculated on the dissolved substances, may be added to said solution, prior to the impregnation, in order to increase its stability, especially at a higher temperature.

Example 2.—65 parts of sodium fluoride and 17–35 parts of anhydrous potassium dichromate are mixed. The mixture obtained can be used for the preservation of wood in a 2% aqueous solution.

Example 3.—50 parts of sodium bifluoride ($NaHF_2$) and 50 parts of sodium chromate ($Na_2CrO_4$) are mixed. For the treatment of wood the mixture is dissolved in water and for impregnating wood a 1.8–2.5% solution of this mixture is used.

Example 4.—55 parts of sodium fluoride are mixed with 25–45 parts of sodium dichromate.

The preservatives according to the present invention are of a particularly high resistance to the leaching out by water and are in addition, to a high degree capable of protecting the wood against destructive fungi, as the difficultly soluble compounds produced in the wood from the originally water-soluble preservatives and combined with the wood fibre, are capable of well defending the wood against the attack of destructive fungi. Besides fluorine compounds and chromium compounds also other protectives against wood destructives, flame protectives for wood or such like, may be added to the preservatives according to the present invention.

We claim:

1. A preservative composition for wood consisting principally of a water-soluble sodium salt of hydrofluoric acid and a water-soluble salt of chromic acid in proportions providing from 5 to 10 atoms of fluorine for each atom of chromium in said salt of chromic acid available for reaction with said sodium salt of hydrofluoric acid.

2. A preservative composition for wood as defined in claim 1 including tartaric acid in quantity sufficient to be effective as a stabilizer for the composition.

KARL WOLMAN.
HANS PFLUG.